United States Patent [19]
Kolb et al.

[11] Patent Number: 6,080,282
[45] Date of Patent: Jun. 27, 2000

[54] ELECTROLYTIC SOLUTION FOR USE AS GEL ELECTROLYTE AND PROCESS FOR MAKING THE SAME

[75] Inventors: Eric S. Kolb, Acton; Martin Van Buren, Chelmsford; Marina Sherman, Sharon, all of Mass.

[73] Assignee: Mitsubishi Chemical Corporation, Japan

[21] Appl. No.: 09/064,441

[22] Filed: Apr. 22, 1998

[51] Int. Cl.[7] .............................. C07F 3/00; C07B 5/00; C08B 2/46; C09K 3/00

[52] U.S. Cl. ................................ 204/157.6; 204/157.63; 522/1; 429/300; 429/303; 429/309; 252/190; 252/192

[58] Field of Search ........................... 204/157.6, 157.63; 522/1; 429/300, 303, 309; 252/62.2, 190, 192

[56] References Cited

U.S. PATENT DOCUMENTS

| | | | |
|---|---|---|---|
| 4,986,633 | 1/1991 | Ohta | ......................................... 350/167 |
| 5,237,031 | 8/1993 | Kubota et al. | ........................... 526/305 |

OTHER PUBLICATIONS

Rezrazi et al., "Conducting and Viscosity Studies of Lithium Ion Conductive Electrolytes Gelled with Poly(Methylmethacrylate)", Advanced Materials Research, vols. 1–2, pp. 495–500, 1994. no month available.

Article "Fast Ion Transport in New Lithium Electrolytes Gelled with PMMA, 1. Influence of Polymer Concentration" *Solid StatIonics 66*, (1993) pp. 97–104 by O. Bohnke, et al. no month available.

Article "Fast Ion Transport in New Lithium Electrolytes Gelled with PMMA, 2. Influence of Lithium Salt Concentration" *Solid State Ionics 66*, (1993) pp. 105–106 By O. Bohnke, et al. no month available.

Article "Ionic Conductivity and Compatibility Studies of Blends of Poly (methyl Methacrylate) and Poly (propylene Glycol) Complexed with $LICF_3SO_3$" *Journal of Polymer Science: Part A*: 1992 no month available.

*Primary Examiner*—Kathryn Gorgos
*Assistant Examiner*—Edna Wong
*Attorney, Agent, or Firm*—Factor & Partners

[57] ABSTRACT

The present invention is directed to both an electrolyte solution for use as a gel electrolyte in an electrolytic cell, and a process for making both the electrolyte gel and the electrolytic cell. The electrolyte solution comprises a polymerizable electrolyte material and a reinforcement polymer. The reinforcement polymer preferably consists of at least poly(methyl methacrylate), while the polymerizable electrolyte material comprises at least a solvent, a monomer, a polymerization initiator, and an ionic conductor. The use of a reinforcement polymer increases the homogeneity and thus the coatability of the electrolytic solution, while also improving the mechanical properties of the cured electrolyte gel.

15 Claims, 3 Drawing Sheets

ELECTROLYTIC SOLUTION FOR USE AS GEL ELECTROLYTE AND PROCESS FOR MAKING THE SAME

BACKGROUND OF THE INVENTION

1. Field of the Invention

The present invention relates in general to electrolytic solutions and, more particularly, to an electrolytic solution for use as a gel electrolyte in an electrolytic cell.

2. Background Art

Electrolytic solutions have been used in forming cured or thermoset gel electrolytes for use in electrolytic cells for several years. In particular, polyethylene oxide (PEO) has been used in combination with other electrolyte materials such as propylene carbonate to form thermoset gel polymer systems. The use of polyethylene oxide has been particularly useful for, among other things, increasing the viscosity of an electrolyte solution to, in turn, improve coating and flow properties on an associated substrate, such as an electrode, before curing the electrolyte solution to a thermoset gel.

Although polyethylene oxide has been used with some degree of success, electrolytic solutions incorporating PEO have had certain drawbacks, such as thermodynamic instability. This instability leads to inadvertent precipitation and crystallization from the solution before intended curing which, in turn, results in non-uniform coatings and subsequent difficulties with controlling coating of the electrolytic solution onto a substrate as well as inhomogeneities of ionic conductivity. Furthermore, the use of PEO has resulted in the formation of thermoset gel electrolytes which lack desired mechanical properties. In particular, these gel electrolytes exhibit relatively low compressive strengths, and a relatively high compressive modulus.

Another type of prior art gel polymer system incorporates poly(methyl methacrylate) (PMMA) into a thermoplastic gel electrolyte. For instance, "Fast Ion Transport in New Lithium Electrolytes Gelled with PMMA", Solid State Ionics 66, pp. 97–104 (1993) by O. Bohnke, et al. disclosed, the use of 30–35 wt. % PMMA to form a thermoplastic electrolytic gel. Moreover, in "Ionic Conductivity and Compatibility Studies of Blends of Poly(methyl Methacrylate) and Poly(propylene Glycol) Complexed with $LiCH_3SO_3$", *Journal of Polymer Science*, Vol. 30, pp. 2025–2031, J. R. Stevens et al. contemplated the polymerization of PMMA to form a thermoplastic gel electrolyte. Finally, in "Conductivity and Viscosity Studies of Lithium Ion Conductive Electrolytes Gelled with Poly(methyl methacrylate)", *Advance Materials Research* (1994), M. Rezrazi et al. used PMMA to form a gel in a liquid electrolyte system.

Although these references disclose the use of PMMA in formation of an electrolytic solution and, in turn, a thermoplastic electrolyte gel, these gel polymer systems either (a) use ranges of PMMA that result in a thermoplastic gel when the PMMA is mixed with propylene carbonate, or (b) use PMMA to form a portion of the thermoplastic gel structure in a gel polymer system. Furthermore, not withstanding the less than desirable mechanical properties of the PMMA based electrolytes, the PMMA in such prior art devices is used as the actual gelling agent, which, in turn, results in a thermoplastic gel.

Accordingly, it is an object of the present invention to provide an electrolytic solution which incorporates PMMA into the electrolyte composition as a reinforcement polymer to increase the mechanical integrity of the resulting thermoset gel electrolyte. It is another object of the present invention to provide an electrolyte having PMMA remaining in solution after curing of the electrolyte.

It is still further an object of the present invention to provide an electrolytic solution which is thermodynamically stable.

It is yet another object of the present invention to provide an electrolytic solution which will facilitate an uniform, homogenous solution having increased coatability and adhesion onto an associated substrate. These and other objects will become apparent in light of the present Specification, Claims and Drawings.

SUMMARY OF THE INVENTION

The present invention is directed to an electrolytic solution for use as a thermoset gel electrolyte in an electrolytic cell, and a process for making same. The electrolytic solution comprises a substantially thermodynamically stable solution consisting of a polymerizable electrolyte material and a reinforcement polymer. In a preferred embodiment, the reinforcement polymer comprises poly(methyl methacrylate) (PMMA).

The polymerizable electrolyte material comprises a solvent, a monomer, a polymerization initiator, and an ionic conductor. Preferably, the solvent may comprise any conventional solvent for use in creating an electrolytic solution, such as propylene carbonate. The monomer preferably comprises at least one of the monomers from the group of PHOTOMER 4050, PHOTOMER 4158, E-20(Acr)2(Ac)2, and E-20(Acr)2(TMS)2, although other monomers are also available for use in the polymerizable electrolyte as would be contemplated by those of ordinary skill in the art. The polymerization initiator may comprise DAROCUR 1173 (2-hydroxy-2-methyl-1-phenyl-propan-1-on), and the ionic conductor may comprise a lithium salt, such as a salt selected from the group consisting of $LiAsF_6$, $LiPF_6$, $LiBF_4$, and $LiClO_4$.

Moreover, in another preferred embodiment, it is also contemplated that the polymerizable electrolyte material may include polyethylene oxide.

The use of a reinforcement polymer such as PMMA increases the homogeneity of the electrolytic solution, as premature precipitation and/or polymerization of the solution is avoided. Accordingly, the electrolytic solution remains free of precipitation or aggregation clumps, thus increasing the coatability of the electrolytic solution onto a substrate such as an electrode.

The present invention is also directed to a process for making a thermoset polymer gel electrolyte for use in an electrolytic cell. Initially, the above described electrolytic solution is formed. This electrolytic solution is then applied by an electrolyte applicator onto a first electrode material. After application, the electrolyte and first electrode may be cured by conventional techniques such as heat, light, IR radiation, or UV radiation. The polymerizable portion of the applied electrolytic solution is polymerized, thus forming a thermoset electrolyte gel. Notably, the reinforcement polymer (PMMA) is not polymerized, thus remaining in solution in the structure of the electrolyte gel.

Next, a second electrode material is applied onto the electrolyte gel. If the electrolyte is only partially cured, the electrolytic cell components would be subjected to further curing. Finally, the fabricated electrolytic cell, comprising a first electrode, a first active material, an electrolyte gel, a second electrode, and a second active material, is collected for storage and/or use.

The thermoset electrolyte gel of the current invention shows increased mechanical properties over prior thermoset electrolyte gels. In particular, the current electrolyte gel shows increased compressive strength, and a relatively low compressive modulus, relative to such prior art electrolytes.

DETAILED DESCRIPTION OF THE INVENTION

Figure 1:
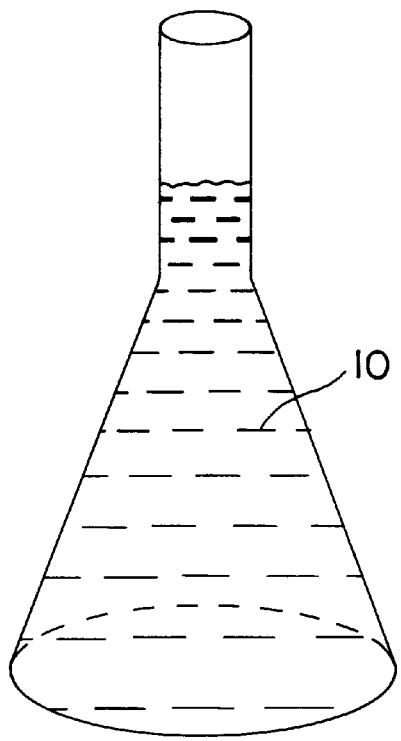
FIG. 1 is a perspective view of the electrolytic solution according to the present invention.

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment so illustrated.

Figure 3:
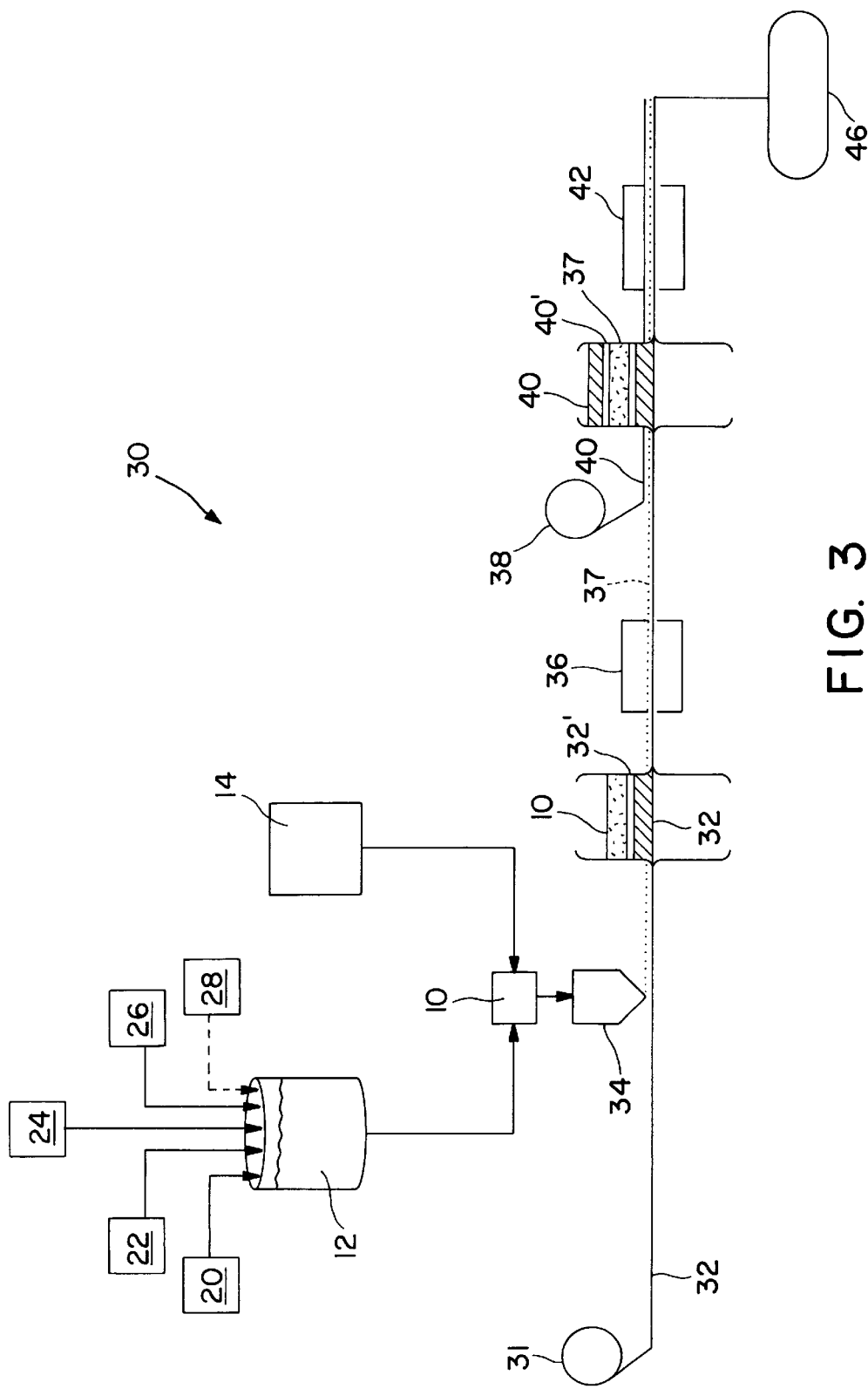
FIG. 3 is a schematic diagram of the process according to the present invention.

Electrolytic solution 10 is shown in FIG. 1, and in greater detail in FIG. 3, as comprising polymerizable electrolyte material 12 and reinforcement polymer 14. Reinforcement polymer 14 consists of at least poly(methyl methacrylate) (PMMA), commercially available from Aldrich Chemical Co. of Milwaukee, Wis. Although PMMA with a molecular weight of 996,000 will be described for use, it is contemplated that the molecular weight of the PMMA may be varied to, for instance, vary the viscosity of the solution or mechanical properties (i.e. compressive strength, compressive modulus) of the resulting electrolytic solution 10 (described below). Likewise, it is also contemplated that the amount of PMMA used as the reinforcement polymer, as well as the amount of PMMA used in the electrolytic solution, may also be varied to control the same properties.

Polymerizable electrolyte material 12 is shown in FIG. 3 as including solvent 20, monomer 22, polymerization initiator 24, and ionic conductor 26. Solvent 20 may comprise any conventional solvent for use in creating an electrolytic solution, such as propylene carbonate. Monomer 22 preferably comprises at least one of the monomers from the group of PHOTOMER 4050, PHOTOMER 4158 (both available from Henkel Corporation of Ambler, Pa.), E-20(Acr)2(Ac)2, and E-20(Acr)2(TMS)2—although other monomers are also available for use in the polymerizable electrolyte as would be readily understood by those of ordinary skill in the art having the present disclosure before them. Polymerization initiator 24 may comprise, for example, DAROCUR 1173 (2-hydroxy-2-methyl-1-phenyl-propan-1-one), available from CIBA-Giegy Corporation of Hawthorne, N.Y., and ionic conductor 26 may comprise a lithium salt, such as $LiAsF_6$, $LiPF_6$, $LiBF_4$ and $LiClO_4$. In particular, the $LiAsF_6$ is electrochemical grade and readily available from FMC Corporation based in Bessemer City, N.C. Although lithium salts are preferred, one of ordinary skill in the art will readily understand that other ionically conducting salts are likewise suitable for use in polymerizable electrolytic solution 10.

Moreover, it is contemplated that polymerizable electrolyte material 12 may also consist of polyethylene oxide 28.

Polyethylene oxide has a preferred molecular weight of 900,000, and is available from Aldrich Chemical. Although the PMMA of the reinforcement polymer may be completely substituted for PEO, the addition of polyethylene oxide to the polymerizable electrolyte material may further increase the viscosity of the electrolytic solution, and thus the coatability and adhesive properties of the electrolyte as applied to an appropriate substrate, such as an electrode as described below. However, it should be understood that the addition of the PEO is not necessary to the teachings of the present invention.

Figure 2:
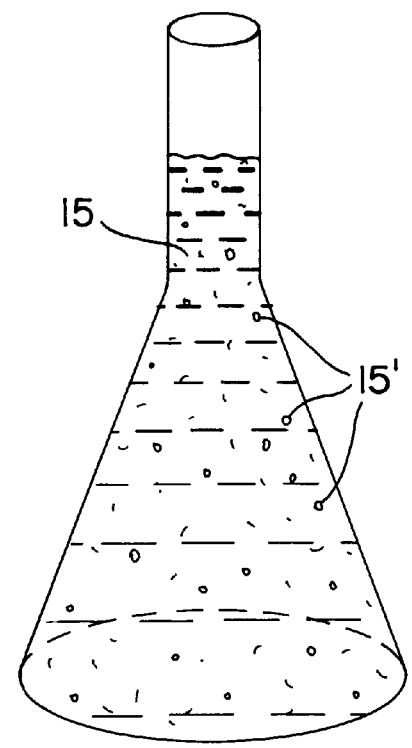
FIG. 2 is a perspective view of a prior art electrolytic solution.

Unlike prior electrolytic solutions using PEO (but not PMMA), electrolytic solution 10, with PMMA functioning as a reinforcement polymer, remains substantially thermodynamically stable prior to curing. This stability prevents the electrolytic solution from phase separating into a non-homogeneous solution, as can be seen from the transparent solution 10 of FIG. 1. In contrast, and as can be seen from FIG. 2, prior art electrolytic solution 15 using PEO as the reinforcement polymer is thermodynamically unstable, thus causing phase separation in the solution. This phase separation makes electrolytic solution 15 appear cloudy. Specifically, this instability results, at least in part, in the formation and precipitation of PEO - lithium salt complexes. These complexes are particularly prevalent when higher lithium salt concentrations, desired to increase the conductivity of the fabricated electrolytic cell, are used in the formation of the electrolytic solution. In particular, pseudoionic physical cross-linking of polymer chains occurs by coordination of lithium cations associated with PEO polymer chains.

These PEO - lithium salt complexes, in turn, result in an electrolytic solution which contains polymer salt agglomerates 15', destroying both the consistency and homogeneity of the electrolytic solution. Accordingly, it becomes more difficult to apply the non-homogeneous electrolytic solution to an electrode substrate.

Process 30 for making a thermoset polymer gel for use in an electrolytic cell is shown in FIG. 3 as comprising web 31 of first electrode material 32, electrolyte applicator 34, curing station 36, web 38 of second electrode material 40, optional second curing station 42, and product collection zone 46. It will be understood that first electrode material 32 and second electrode material 40 are each associated with at least an active material (of conventional formulation) thereon, 32' and 40' respectively.

In operation, electrolytic solution 10 is first fabricated from polymerizable electrolyte material 12 and reinforcement polymer 14. As described above, polymerizable electrolyte material 12 is formed by combining solvent 20, monomer 22, polymerization initiator 24, and ionic conductor 26. As previously stated, PEO 28 may also be added if desired.

First electrode 32 is fed from first electrode web 31 on a continuous web feed conveyor system to conventional electrolyte applicator 34. The electrolyte applicator applies electrolytic solution 10 on top of the first electrode material. Thereafter, first electrode material 32 and associated electrolytic solution 10 are exposed to first curing station 36. Here, the first electrode material and electrolytic solution are cured with conventional curing techniques, such as exposure to heat, light, ultraviolet radiation, etc. The polymerizable portion of the electrolytic solution becomes polymerized, thus forming a thermoset electrolyte gel 37. Notably, the reinforcement polymer is not further polymerized, thus remaining in solution in the structure of electrolyte gel 37.

After the electrolyte has been at least partially cured, second electrode material 40 from second web 38 is applied onto electrolyte gel 37. Upon application of the second electrode material, electrolyte gel 37 is positioned between first and second electrodes 32 and 40, respectively.

Figure 4:
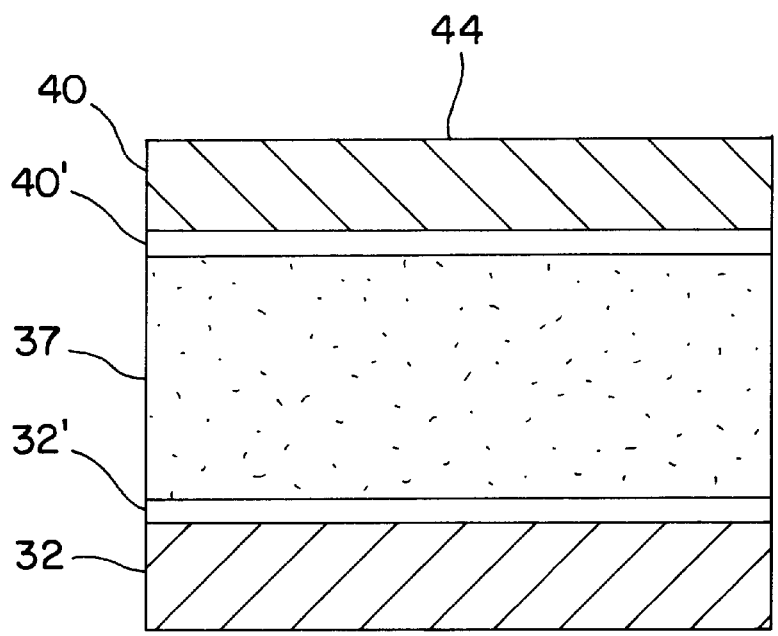
FIG. 4 is a front elevated cross sectional view of an electrolytic cell according to the present invention.

Once second electrode material 40 has been applied, and if electrolyte 37 is only partially cured, the electrolytic cell components would then be exposed to a further second curing station 42 to further cure/polymerize the (electrolyte. From there, the fully assembled electrolytic cell 44, shown in FIG. 4 as comprising first electrode 32, first active material 32', electrolyte gel 37, second active material 40', and second electrode 40, is collected in product collection zone 46 for use and/or storage.

The use of a PMMA reinforcement polymer in the electrolytic solution offers a number of advantages. First, as discussed above, when the reinforcement polymer is added to the electrolytic solution, the solution is thermodynamically stable. Indeed, the reinforcement polymer does not precipitate, crystallize, or phase separate out of the electrolytic solution before application to an electrode surface and/or prior to intended curing/polymerizing. Accordingly, the electrolytic solution possesses increased homogeneity and coatability for application to an electrode surface.

Next, as mentioned above, both the amount of reinforcement polymer/PMMA used in the electrolytic solution and the molecular weight of the reinforcement polymer/PMMA may be varied to control the application, viscosity, and mechanical properties of the resulting electrolyte gel. Indeed, the use of the PMMA reinforcement polymer also improves the mechanical properties of the electrolyte gel (which also maintains excellent conductivity and viscosity) relative to prior art electrolyte gels. In particular, the electrolyte gel which maintains the PMMA reinforcement polymer in solution demonstrates increased compressive strength and a relatively low compressive modulus as compared against such prior art electrolytes. These characteristics are desirable as, among other reasons, the electrolyte gel becomes stronger and obviates the need for mechanical separators, such as charge separators or electrode masks, which are often placed between the electrodes of an electrolytic cell to maintain separation of the electrodes.

In support of the improved mechanical properties possessed by the electrolyte gel of the current invention, several tests were run, all following a common procedure. First, filtered propylene carbonate (Aldrich Chemical) was added via a 60 mL syringe using a 16 gauge needle and a Cole/Parmer 50 mm 1.0 micron filter unit to a two liter 3 necked round bottom flask with a glass stir rod and a TEFLON paddle. The flask was then placed in a silicon oil bath, with the stirring rod and TEFLON paddle activated to mix the solution.

Next, when using PMMA as a reinforcement polymer (samples 1–3 below), the appropriate amount of 990,000 molecular weight PMMA (other molecular weights are likewise contemplated) was added to the propylene carbonate in 5 to 10 gram increments. The propylene carbonate - PMMA mixture was then mixed for 15–30 minutes at room temperature, until all of the PMMA completely dispersed in solution with the propylene carbonate.

The heat controller, associated with the silicon bath, was then activated and set in the range of 48.2–49.9° C. The mixture was heated and stirred until the PMMA dissolve into a viscous, transparent solution. The heat cycling continued for approximately 12 hours, before the solution was cooled. Upon cooling of the propylene carbonate-PMMA solution, $LiAsF_6$ was added in 5–10 g increments. This solution was then mixed until all of the Li salt was dissolved.

Next, PHOTOMER 4050 and PHOTOMER 4158 was added to the solution, which was then mixed for about 1 hour. (An alternative, monomers may be added one at a time, and the solution can be mixed for 30 minutes following each addition).

Finally, DAROCUR 1173 (CIBA-Giegy) was added to the solution and mixed for at least 30 minutes. Inasmuch as DAROCUR 1173 is a polymerization initiator, the flask was covered with aluminm foil to shield the solution from UV light and premature polymerization. The final electrolytic solution was then placed in dry brown glass bottles and stored at room temperature to prevent polymerization of the solution by stray UV light or high temperatures. All resulting solutions exhibited a substantially transparent appearance after formation and during storage—which supports the homogenous thermodynamic stability of the solution. This electrolytic solution was then poured into PYREX petri dishes to a depth of 10 mm. and polymerized/cured by exposure to UV light from a medium pressure Hg lamp for between 1–15 minutes.

Seven electrolytic gel samples were formed from electrolytic solutions fabricated according to the above-identified procedures. Three of these samples (1–3) contain varying amounts of PMMA as a reinforcement polymer—Table 1 lists the composition of these PMMA containing samples. The four other electrolytic gel samples (4–7) were formed according to the same previously described procedures, except that PEO was substituted for PMMA.

TABLE 1

| Composition (pph) | Sample # | | | | | | |
|---|---|---|---|---|---|---|---|
| | 1 | 2 | 3 | 4 | 5 | 6 | 7 |
| Propylene Carbonate | 65.48 | 62.22 | 61.76 | 67.67 | 67.67 | 72.75 | 77.90 |
| PMMA (MW = 990K) | 4.84 | 7.45 | 2.67 | | | | |
| PEO (MW = 300K) | | | | | 1.79 | | |
| PEO (MW = 4M) | | | | 1.79 | | 0.40 | 0.40 |
| $LiAsF_6$ | 19.37 | 19.88 | 19.99 | 20.00 | 20.00 | | |
| $LiPF_6$ | | | | | | | |
| $LiClO_4$ | | | | | | 12.01 | 11.97 |
| E-20(Acr)2(Ac)2 | | | | | | | |
| E-20(Acr)2(TMS)2 | | | 12.06 | | | 12.01 | |
| PHOTOMER 4050 | 7.72 | 7.94 | 3.01 | 8.00 | 8.00 | 3.09 | 6.20 |
| PHOTOMER 4158 | 2.05 | 1.98 | | 2.00 | 2.00 | | 3.10 |
| DAROCUR 1173 | 0.54 | 0.52 | 0.50 | 0.50 | 0.50 | 0.50 | 0.50 |

Wherein pph is parts per hundred

After curing/polymerization, each of the above seven samples were then tested for mechanical integrity, namely compressive strength and compressive modulus. The results of the mechanical strength testing is shown below in Table 2.

TABLE 2

| Sample # | Compressive Strength $g/mm^2$ | Compressive Modulus $g/mm^2$ |
|---|---|---|
| 1 | 24.80 | 1.79 |
| 2 | ≧25.50 | 1.28 |
| 3 | 23.70 | 3.33 |
| 4 | 19.00 | 2.86 |
| 5 | 15.50 | 2.44 |
| 6 | 9.90 | 0.89 |
| 7 | 6.90 | 1.00 |

Figure 5:
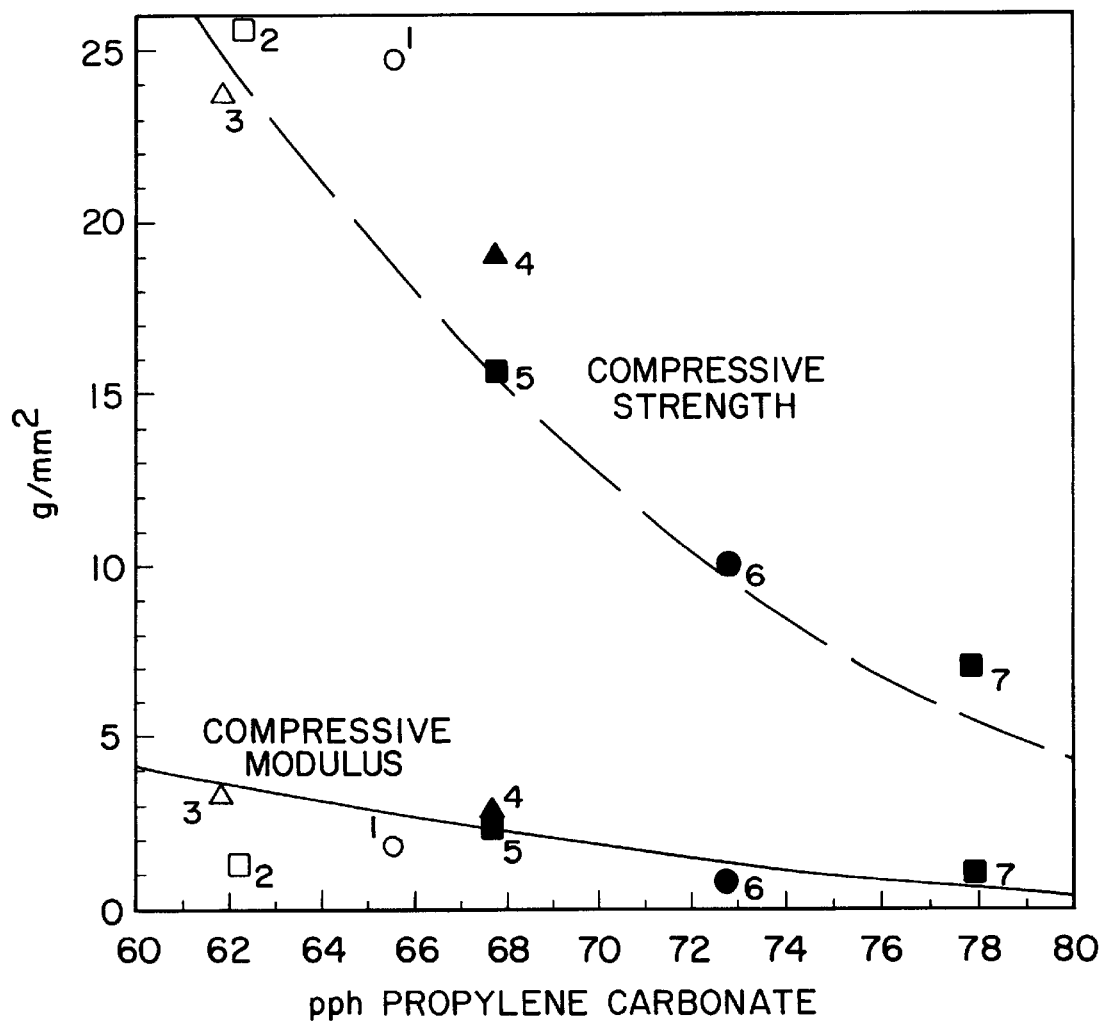
FIG. 5 is a graph depicting the improved mechanical properties of an electrolyte gel having PMMA substituted for PEO.

A graph depicting the results of Table 2 is shown in FIG. 5 and better illustrates the effect of substituting PMMA for PEO, as a reinforcement polymer, in the fabrication of an electrolyte gel. Each sample, represented by a different shape on the graph and indicated by its associated sample number, has both a compressive strength reading and a compressive modulus reading. The gels using PMMA are represented by hollow shaped dots, while the gels using PEO are represented by solid shaped dots. Moreover, the dotted line indicates the approximate compressive strength distribution, while the solid line indicates the approximate compressive strength modulus distribution.

As can be seen from the above, the use of PMMA as a reinforcement polymer in fabricating the electrolyte gel results in a gel with a higher compressive strength and a relatively low compressive modulus when compared to prior art gels formed with PEO.

In addition to the above, a further test was performed wherein the molecular weight of the PMMA was varied to illustrate control over the viscosity of the electrolytic solution. In this test, two electrolytic solutions were prepared, with a PMMA reinforcement polymer comprising 5 wt. % of the electrolytic solution. The first electrolytic solution contained PMMA with a molecular weight of 996,000, while the second electrolytic solution contained PMMA with a molecular weight of 350,000. The first solution had measured viscosity of 2733 cps, while the second solution recorded a viscosity of 1742 cps. As can be seen, by varying the molecular weight of the PMMA, the viscosity of the electrolytic solution may be controlled.

The foregoing description and drawings merely explain and illustrate the invention, and the invention is not limited thereto except insofar as the appended claims are so limited as those skilled in the art who have the disclosure before them will be able to make modifications and variations therein without departing from the scope of the invention.

What is claimed is:

1. An electrolytic solution for use as a gel electrolyte in an electrolytic cell comprising:
    a substantially thermodynamically stable solution including:
        a polymerizable electrolyte material including polyethylene oxide; and
        a reinforcement polymer including poly(methyl methacrylate), associated with the polymerizable electrolyte material.

2. The electrolytic solution according to claim 1 wherein the polymerizable electrolyte material includes:
    a solvent, a monomer, a polymerization initiator and an ionic conductor.

3. The electrolytic solution according to claim 2 wherein the ionic conductor comprises a salt.

4. The electrolytic solution according to claim 1 wherein the polymerizable electrolyte material includes polyethylene oxide having a molecular weight of at least 300,000.

5. The electrolytic solution according to claim 1 wherein the electrolytic solution has a viscosity; the electrolytic solution further including means for controlling the viscosity, wherein the viscosity control means comprises the amount of the poly(methyl methacrylate) used in the electrolytic solution.

6. The electrolytic solution according to claim 5 wherein the viscosity control means comprises the molecular weight of the poly(methyl methacrylate) used in the electrolytic solution.

7. The electrolytic solution according to claim 1 further including means for increasingly controlling compressive strength of a cured polymerizable electrolyte material, wherein the compressive strength control means comprises the amount of the poly(methyl methacrylate) used in the electrolytic solution.

8. The electrolytic solution according to claim 7 wherein the compressive strength control means comprises the molecular weight of the poly(methyl methacrylate) used in the electrolytic solution.

9. A process for making a thermoset polymer gel electrolyte for use in an electrolytic cell comprising the steps of:
    mixing a polymerizable electrolyte material including polyethylene oxide with a reinforcement polymer, wherein the reinforcement polymer includes poly(methyl methacrylate), to, in turn, formulate a substantially thermodynamically stable solution; and
    exposing the substantially thermodynamically stable solution to a curing source.

10. The process according to claim 9 further including the step of fabricating the polymerizable electrolyte material, wherein the step of fabricating includes the step of:
    associating a solvent, a monomer, a polymerization initiator and an ionic conductor with each other.

11. The process according to claim 10 wherein the ionic conductor is a salt.

12. The process according to claim 9 further including the step of controlling the viscosity of the solution by altering the amount of the reinforcement polymer in the solution.

13. The process according to claim 9 further including the step of controlling the compressive strength of the thermoset polymer gel electrolyte by altering the amount of the reinforcement polymer in the solution.

14. The process according to claim 9 further including the step of applying the solution onto a substrate after the step of exposing the solution to the curing source.

15. The process according to claim 9 wherein the curing source is selected from the group consisting of an ultra violet light source, infrared radiation source, oven, electron beam, other heat emitting source, and combinations thereof.

* * * * *